United States Patent
Rifu (10) Patent No.: US 7,330,594 B2
(45) Date of Patent: Feb. 12, 2008

(54) IMAGE ENHANCEMENT OR CORRECTION SOFTWARE, METHOD, APPARATUS AND SYSTEM FOR SUBSTANTIALLY MINIMIZING BLUR IN THE SCANNED IMAGE

(75) Inventor: Toshihiro Rifu, Saitama (JP)

(73) Assignees: Kabushiki Kaisha Toshiba, Tokyo (JP); Toshiba Medical Systems Corporation, Tochigi Ken (JP)

( * ) Notice: Subject to any disclaimer, the term of this patent is extended or adjusted under 35 U.S.C. 154(b) by 485 days.

(21) Appl. No.: 10/903,619

(22) Filed: Jul. 30, 2004

(65) Prior Publication Data

US 2005/0220357 A1     Oct. 6, 2005

(30) Foreign Application Priority Data

Jul. 31, 2003    (JP) .............................. 2003-205025

(51) Int. Cl.
*G06K 9/62* (2006.01)
*G06K 9/00* (2006.01)

(52) U.S. Cl. ...................................... 382/225; 382/131

(58) Field of Classification Search ........ 382/128–134; 358/505
See application file for complete search history.

(56) References Cited

U.S. PATENT DOCUMENTS

| | | | | |
|---|---|---|---|---|
| 4,484,230 A | * | 11/1984 | Pugsley | 358/447 |
| 4,996,480 A | * | 2/1991 | Maeda et al. | 324/309 |
| 5,339,828 A | * | 8/1994 | Keating et al. | 600/572 |
| 5,737,456 A | * | 4/1998 | Carrington et al. | 382/299 |
| 6,278,767 B1 | | 8/2001 | Hsieh | |
| 6,460,003 B1 | * | 10/2002 | Kump et al. | 702/85 |
| 6,525,302 B2 | * | 2/2003 | Dowski et al. | 250/201.2 |
| 6,658,142 B1 | * | 12/2003 | Kam et al. | 382/130 |
| 6,928,182 B1 | * | 8/2005 | Chui | 382/131 |
| 7,127,096 B2 | * | 10/2006 | Kaufman et al. | 382/131 |

FOREIGN PATENT DOCUMENTS

| | | |
|---|---|---|
| JP | 11-342132 | 12/1999 |
| JP | 2000-350726 | 12/2000 |
| WO | WO 00/22573 | 4/2000 |

* cited by examiner

*Primary Examiner*—Bhavesh M Mehta
*Assistant Examiner*—Hadi Akhavannik
(74) *Attorney, Agent, or Firm*—Knoble Yoshida & Dunleavy, LLC (57) ABSTRACT

Three-dimensionally reconstructed images are not ideal due to blur or smear that is caused by various sources in an X-ray CT scanner. In order to substantially minimize the blur in the three-dimensionally reconstructed image, a known PSF is weighed according to a combination of predetermined parameters. The parameters include two types of information. One group of the parameters is related to device characteristics of the scanner device while the other is related to the scanning conditions of a particular scan. The improvement is performed in any combination of the X, Y and Z directions. The improved PSF's are used to de-convolute the three-dimensionally reconstructed CT image. As a result, the blur and smear are substantially removed from the three-dimensionally reconstructed image data for good visualization as well as accurate physical measurements in the scanned image. The improved techniques according to the current invention are applicable to two-dimensional image data.

26 Claims, 3 Drawing Sheets

FIG. 2

FIG. 3A
KNOWN WIRE OBJECTS

FIG. 3B
KNOWN PSF'S

Fig. 3C
SET OF PARAMETERS
- DEVICE INFORMATION
- SCANNING CONDITIONS

FIG. 3D
IMPROVED PSF'S

FIG. 3E
RECONSTRUCTED 3D IMAGE FROM SCANNED CT IMAGE DATA

FIG. 3F
IMPROVED 3D IMAGE

IMAGE ENHANCEMENT OR CORRECTION SOFTWARE, METHOD, APPARATUS AND SYSTEM FOR SUBSTANTIALLY MINIMIZING BLUR IN THE SCANNED IMAGE

FIELD OF THE INVENTION

The current invention is generally related to an image enhancement or correction technique for improving image resolution, and more particularly related to the image enhancement or correction software, method, apparatus and system for substantially minimizing blur or smear in the three-dimensionally reconstructed scan image data from an X-ray computer assisted tomography or computerized tomography (CT) scanner.

BACKGROUND OF THE INVENTION

In recent years, X-ray CT scanners have made significant improvement and have been widely used for computerized tomography. The use of the scanner is not only in the medical field, but also in other fields including industrial applications. The X-ray CT scanners have also made rapid advancements. For example, in response to the demands from the medical community for high resolution and wide scanning range, multi-slice X-ray CT scanners have been developed for wide use. The multi-slice X-ray CT scanner generally includes an X-ray source for radiating a fan beam X-ray in a slice direction and two-dimensional X-ray detector elements also placed in the slice direction. The slice direction is generally the longitudinal axis of a scanning bed where a patient lies. The X-ray detector includes 4, 8, 16 or 32 rows of the detector elements as commercially available from Toshiba Medical Systems in Aquilion Models. As will be later described in detail, the scan operation is performed in a multi-scan mode or a helical-scan mode in the CT scanner. Due to the above advancement, the three-dimensional image data is obtained in a shorter period of time at higher accuracy over a more extended area of the patient in comparison to the single-slice X-ray CT scanner.

The above obtained image data is reconstructed in three dimension for not only display but also for other various purposes. For example, one medical purpose is to measure the clot size or the occlusion rate due to stenosis in the blood vessels. To perform the above measurements, after a patient is injected with a contrast agent, the three-dimensional image data is obtained via the X-ray CT scanner for imaging the distribution of the contrast agent flowing in the blood vessels. Based upon the distributed CT values of the contrast agent that is reflected in the three-dimensional image data, the clot size and the occlusion rate are actually measured. In case of the occlusion rate measurement, the rate is determined based upon the comparison of the internal thickness or distance of the vessel at the normal area and at the occluded area as represented in the three dimensional image data or volume data. For the blood vessel thickness measurements, a predetermined threshold value is established for the CT values. In the above examples, although the above three-dimensional image data is obtained by the X-ray CT scanner, the three-dimensional image data is also obtained by other types of scanners.

Other types of scanners include ultrasound imaging scanners and magnetic resonance imaging scanners. To assuredly perform the blood vessel measurement for the displayed image, Japanese Patent Application 11-342132 discloses a blood vessel size measuring technique based upon the pixel value profile in the desired area that is perpendicular to the cross sectional area of the blood vessel. On the other hand, Japanese Patent Application 2000-350726 discloses a technique for accurately measuring the length of objects such as blood vessels and intestines having curves in the directions that are not parallel to the projection surface based upon the maximal intensity projection (MIP) image.

For the measurements or display of certain minute structures, the CT scanner systems generally experience a certain amount of blur, smear or inaccuracy in the three-dimensional image data. The blur in the image or the smeared-out image is caused by the limit in spatial resolution. The spatial resolution also depends upon the basic performance characteristics of the scanner as well as the scan conditions. For example, the basic performance characteristics of the scanner device include the pitch between two adjacent detector elements. The scan conditions include conditions under which a particular scan is performed or the three dimensional image is reconstructed. One example of the conditions includes a slice thickness of the scan. As the slice thickness is made larger along the body axis of the patient or the Z direction, the spatial resolution along the Z direction decreases. Consequently, the blur is caused in the Z direction or the body axis for a lower quality image. Ultimately, the inaccurate measurements of certain structures such as the thickness of blood vessel walls lead to unreliable information including the occlusion rate. Some aspects of a point spread function (PSF) are disclosed in "Imaging" PCT Application, WO 00/22573, Chui et al.

The super-resolution or corrective process is performed in predetermined directions with respect to the scanning direction. Assuming the scanning direction is the Z direction or the body axis, the blur in the CT image occurs in the X and Y directions that are perpendicular to the Z direction. However, the amount of blur or PSF differs in each direction in the three-dimensional image data. As the result of the differing spatial resolutions, the image quality is not stable.

For the above described problem, it is desired to substantially minimize the effect of the blur on the scanned three-dimensional image data for accurately measuring a certain structure of interest. In substantially eliminating the blur, it is also desired to apply a technique that is applicable to the three-dimensional image data that is scanned by various types of scanners and under varying conditions. Ultimately, it is desired to improve high-quality three-dimensional image data.

SUMMARY OF THE INVENTION

In order to solve the above and other problems, according to a first aspect of the current invention, a method of substantially minimizing blur in image data, including the steps of: determining a point spread function (PSF) based upon the first image data by scanning a known object; scanning an object of interest to generate second image data with X-ray CT scanning parameters; obtaining an improved PSF based on a combination of scanning parameters and the PFS, the scanning parameters including at least one of slice thickness of detector collimation, slice thickness for reconstruction, type of convolution filter, type of reconstruction mode, pixel size, helical pitch and focus size; and deconvoluting the second image data with the improved PSF.

According to a second aspect of the current invention, a method of substantially minimizing blur in image data, including the steps of: determining a point spread function (PSF) based upon the first three-dimensional image data by scanning a known object; scanning an object of interest to generate second three-dimensional image data with X-ray CT scanning parameters; obtaining an improved PSF based on a combination of parameters and the PFS, the parameters including a combination of device-dependent parameters and scanning condition parameters to generate the improved PSF, the scanning parameters including at least one of slice thickness of detector collimation, slice thickness for reconstruction, type of convolution filter, type of reconstruction mode, pixel size, helical pitch and focus size; and de-convoluting the second three-dimensional image data with the improved PSF.

According to a third aspect of the current invention, a method of substantially minimizing blur in image data, including the steps of: scanning a known object to generate first image data; determining a point spread function (PSF) based upon the first image data for the known object; scanning an object of interest to generate second image data; weighing the PSF according to a combination of parameters to generate an improved PSF, the parameters including a combination of device-dependent parameters and scanning condition parameters, a value of each of the parameters being ultimately associated with a predetermined weight value, the device dependent parameters including $d_{focus-x}$ for indicating a focus size in the x-direction $d_{focus-z}$ for indicating a focus size in the Z-direction, $a_{det-x}$ for indicating a detector aperture in the x-direction and $d_{focus\ to\ enter}$ for indicating a distance between a focus and a rotation center; and de-convoluting the second image data with the improved PSF.

According to a fourth aspect of the current invention, a method of substantially minimizing blur in image data, including the steps of: scanning a known object to generate first image data; determining a point spread function (PSF) based upon the first image data for the known object; scanning an object of interest to generate second image data; weighing the PSF according to a combination of parameters to generate an improved PSF, the parameters including a combination of device-dependent parameters and scanning condition parameters, a value of each of the parameters being ultimately associated with a predetermined weight value, the scanning condition parameters including $t_{detector\ collimation}$ for indicating a slice thickness of detector collimation $t_{reconstruction}$ for indicating a slice thickness for reconstruction type$_{conv.\ filter}$ for indicating a type of convolution filter for reconstruction type$_{reconstruction}$ for indicating a type of a reconstruction mode, size$_{pixel}$ for indicating a pixel size and $p_{helical}$ for indicating a helical pitch; and de-convoluting the second image data with the improved PSF.

According to a fifth aspect of the current invention, a method of substantially minimizing blur in image data, including the steps of: generating an image data by reconstructing scan data obtained by scanning of an object with X-ray CT scanning parameters; obtaining an improved point spread function (PSF) based upon a combination of the scanning parameters and a PFS previously determined based upon an image data obtained by scanning a known object, the scan parameters including at least one of type of convolution filter, type of reconstruction mode, pixel size, helical pitch and focus size; and de-convoluting the second image data with the improved PSF.

According to a sixth aspect of the current invention, an apparatus for substantially minimizing blur in scanned image data, including: a scanning unit for respectively scanning a known object to generate first image data and an object of interest to generate second image data; a data processing unit connected to the scanning unit for determining a point spread function (PSF) based upon the first image data for the known object, the data processing unit correcting the PSF according to a combination of parameters to generate an improved PSF, the data processing unit de-convoluting the second image data with the improved PSF for substantially minimizing blur in the second image data; and a memory unit connected to the scanning unit and the data processing unit for storing the parameters, the first image data and the second image data, the parameters including a combination of device-dependent parameters and scanning condition parameters, the device dependent parameters including $d_{focus-x}$ for indicating a focus size in the x-direction, $d_{focus-z}$ for indicating a focus size in the Z-direction $a_{det-x}$ for indicating a detector aperture in the x-direction and $d_{focus\ to\ center}$ for indicating a distance between a focus and a rotation center.

According to a seventh aspect of the current invention, an aperture for substantially minimizing blur in scanned image data, including: a scanning unit for respectively scanning a known object to generate first image data and an object of interest to generate second image data; a data processing unit connected to the scanning unit for determining a point spread function (PSF) based upon the first image data for the known object, the data processing unit correcting the PSF according to a combination of parameters to generate an improved PSF, the data processing unit de-convoluting the second image data with the improved PSF for substantially minimizing blur in the second image data; and a memory unit connected to the scanning unit and the data processing unit for storing the parameters, the first image data and the second image data, the parameters including a combination of device-dependent parameters and scanning condition parameters, the scanning condition parameters including $t_{detector\ collimation}$ for indicating a slice thickness of detector collimation, $t_{reconstruction}$ for indication a slice thickness for reconstruction type$_{conv.\ filter}$ for indicating a type of convolution filter for reconstruction type$_{reconstruction}$ for indicating a type of a reconstruction mode, size$_{pixel}$ for indicating a pixel size and $p_{helical}$ for indicating a helical pitch.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Based upon incorporation by external reference, the current application incorporates all disclosures in the corresponding foreign priority document (JP 2003-205025 filed Jul. 31, 2003) from which the current application claims priority.

Figure 1:
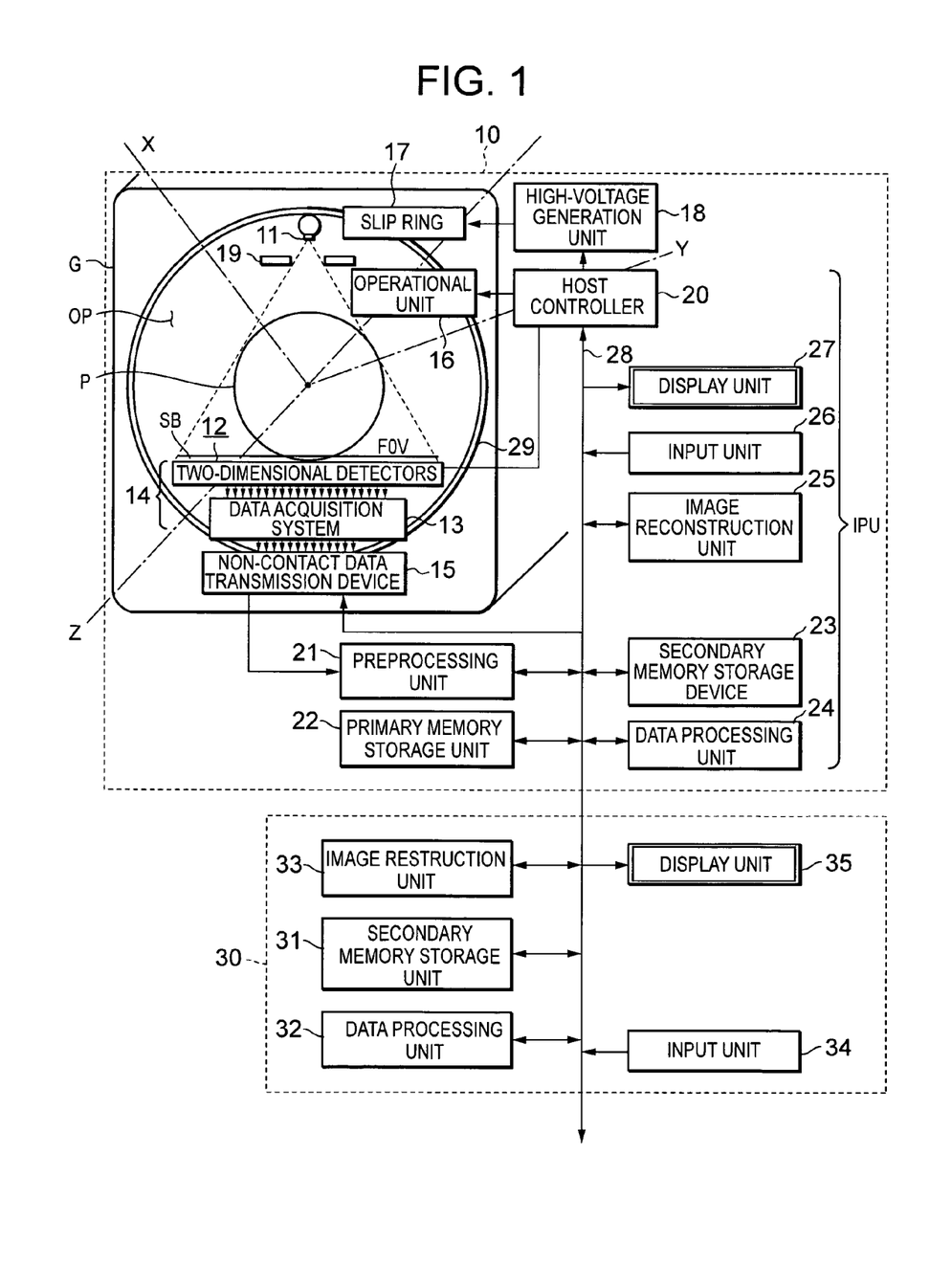
FIG. 1 is a block diagram illustrating one preferred embodiment of a multi-slice CT scanner device and an external image processing device or console according to the current invention.

Referring now to the drawings, wherein like reference numerals designate corresponding structures throughout the views, and referring in particular to FIG. 1, a block diagram illustrates one preferred embodiment of a multi-slice CT scanner device 10 and an external image processing device or console 30 according to the current invention. The multi-slice CT device 10 generally includes a donut-shaped gantry G in which a known object or a subject such as a patient P is scanned by an X-ray. The multi-scan CT device 10 also includes a data processing unit IPU where the scanned data is processed. The gantry G further includes a slip ring 17, a rotational ring portion 21, a gantry operational unit 16, an X-ray tube 11 and an X-ray detection system 14. The X-ray tube 11 is an X-ray radiation source that is located opposite from the X-ray detection system 14 on the rotational ring portion 21, and the patient P is inserted between the X-ray tube 11 and the X-ray detection system 14 through an opening OP of the gantry G.

The multi-slice CT device 10 generally performs a scan process to collect desirable scan data of the patient P or a known object. The patient P is placed on a scanning bed SB that is located near the gantry G along a predetermined Z direction as indicated by dotted line. In general, the body axis of the patient P is parallel to the Z direction. The bed SB moves through the opening OP carrying the patient along the Z direction under the control of a host controller 20. While the patient P is being moved, the host controller 20 controls via the gantry operational unit 16 the rotation of the rotational ring portion 21 about a central axis of the opening OP at a predetermined high speed of less than one second per revolution.

As the rotational ring portion 21 rotates, a predetermined amount of the X-ray is radiated towards the patient P from the X-ray tube 11, and some of the radiated X-ray reaches the X-ray detection system 14. The X-ray is generated from the high-voltage electricity that is supplied from a high-voltage source 18 via the slip ring 17 to the X-ray tube 11. The X-ray is projected within a predetermined field of vision area of the patient P in a cone-beam or a fan-shaped beam through a collimator 19. The collimator 19 is located between the X-ray tube 11 and the patient P to adjust the size and the shape of the above X-ray projection. The projected X ray extends in two directions. One direction is a slice direction that is parallel to the rotational axis, and the slice direction is a direction that a progressive scan is made by a series of the projected X-ray to generate scanned images. The other direction is a channel direction that is perpendicular to the slice direction. Since the patient P lays on the moving bed in the longitudinal direction, the longitudinal body axis coincides with the slice direction. Thus, both the X-ray tube 11 and the X-ray detection system 14 rotate around the patient P at a relative mutual position in order to collect the scanning data at a predetermined high speed.

The X-ray detection system 14 includes a two-dimensional X-ray detection unit 12 and a data acquisition system 13, both of which are located on the rotational ring portion 21. The two-dimensional detection unit 12 rotates around the scanning bed SB and detects the X-ray projected from the X-ray tube 11 through the patient P. The detected X-ray signal is collected through a predetermined electric circuit in the data acquisition system 13 before it is outputted to a non-contact data transmission unit 15 located in the gantry G. The data from the data acquisition system 13 on the rotational ring portion 21 is transmitted to the non-contact data transmission device 15 in a non-contact manner such as wireless data transfer.

The multi-slice CT device 10 performs a scan process to collect desirable scan data. The scan processes include a combination of the following scanning characteristics such as helical, circular (non-helical), a single-slice and multi-slice. Some examples of the scanning characteristics are a helical scan process, a circular single-slice scan process and or a circular multi-slice scan process. In the helical scan process, the scanning bed SB maintains the Z-directional movement at a predetermined speed while the rotational ring portion 21 also maintains its rotation at a predetermined angular velocity. Thus, the scanned data reflects scanning surfaces whose outer edges resemble a helical orbit. In contrast, the circular single-slice scan process collects data from a single detector during a single revolution along a circular orbit at a particular known fixed location. In other words, each set of the collected data reflects a single scanning surface that is substantially perpendicular to the Z direction. On the other hand, the conventional multi-slice scan process collects data from multiple detectors during a single revolution along a circular orbit at a particular known fixed location. In other words, each set of the collected data reflects multiple scanning surfaces that are substantially perpendicular to the Z direction. In the preferred embodiment, any of the above described scanning processes is used to practice the current invention.

The image data processing unit IPU includes the following various units to control the gantry during the scanning operation as wells as to process the collected data from the gantry G. Prior to the scanning process, parameters are inputted for specifying certain aspects of scanning via an input device 26. Based upon the inputted parameters, the host controller 20 controls the high voltage generation device 18 for generating the high voltage and the gantry operational unit 16 for rotating the rotational ring portion 21 and the scanning bed SB for moving the patient B. A preprocessing unit 21 receives the collected scan data from the non-contact data transmission device 15 prior to reconstruction. The data is stored in a primary memory storage unit 22 and or a secondary memory storage unit 23. A data processing unit 24 and a reconstruction unit 25 process the collected data before rendering a desired image on a display unit 27 according to certain other parameters that have been inputted by the input device 26. The above mentioned units are connected through a common bus 28.

In addition, the common bus 28 is also optionally connected to the external image processing device 30. As described above, the external image processing device 30 includes a secondary memory storage unit 31, a data processing unit 32 and a reconstruction unit 33, an input device 34 and a display unit 35. The bus 28 is also connected with each other to support the communication between the internal image processing unit IPU and the external image processing unit 30. However, these two processing units are also communicated through other means or in other manners.

In the above described preferred embodiment, the image data collection and the image processing are performed at a high speed. For example, the X-ray detection operation is repeated approximately 1000 times during each revolution or during approximately one second. Because of the above sampling rate, a voluminous amount of two-dimensional projection data is generated 0.1000 times for M×N channels for each revolution of the two-dimensional X-ray detection unit 12 around the patient P. In order to transmit the rapidly occurring voluminous two-dimensional projection data without delay, the data acquisition system 12 and the non-contact transmission unit 15 both also operate at a high speed to output the projection data to the preprocessing unit 21. The preprocessing unit 21 performs sensitivity correction and or X-ray strength correction on the received projection data. After the above corrections, the two-dimensional projection data for 360 degrees such as 1000 sets or 1000 views is temporarily stored in the secondary memory storage unit 23. The image reconstruction unit 25 reconstructs a cross-sectional image data for each slice by performing a predetermined reconstruction method such as a fan beam reconstruction method or a cone beam reconstruction method on the projected data that is stored in the secondary memory storage unit 23. Thus, three-dimensional image data is generated and subsequently stored in the primary memory storage unit 22.

According to the current invention, the data processing unit 24 carries out a post reconstruction process in order to minimize blur, smear or fuzziness in the three-dimensionally reconstructed image data in one preferred embodiment. In another preferred embodiment, the above blur-minimization process is performed by the image reconstruction unit 25. Furthermore, in yet another preferred embodiment, the above blur-minimization process is performed by the data processing unit 32 and or the image reconstruction unit 33 of the external image processing device or console 30. The external image processing device or console 30 is optionally located at a remote site such as a data processing center. In an alternative embodiment, the above blur-minimizing process is performed by an independent general computer that is separate from the multi slice CT device. In other words, the data processing unit 24, 32, the image reconstruction unit 25, 33 or the general computer functionally implements the image data processing device according to the current invention.

Figure 2:
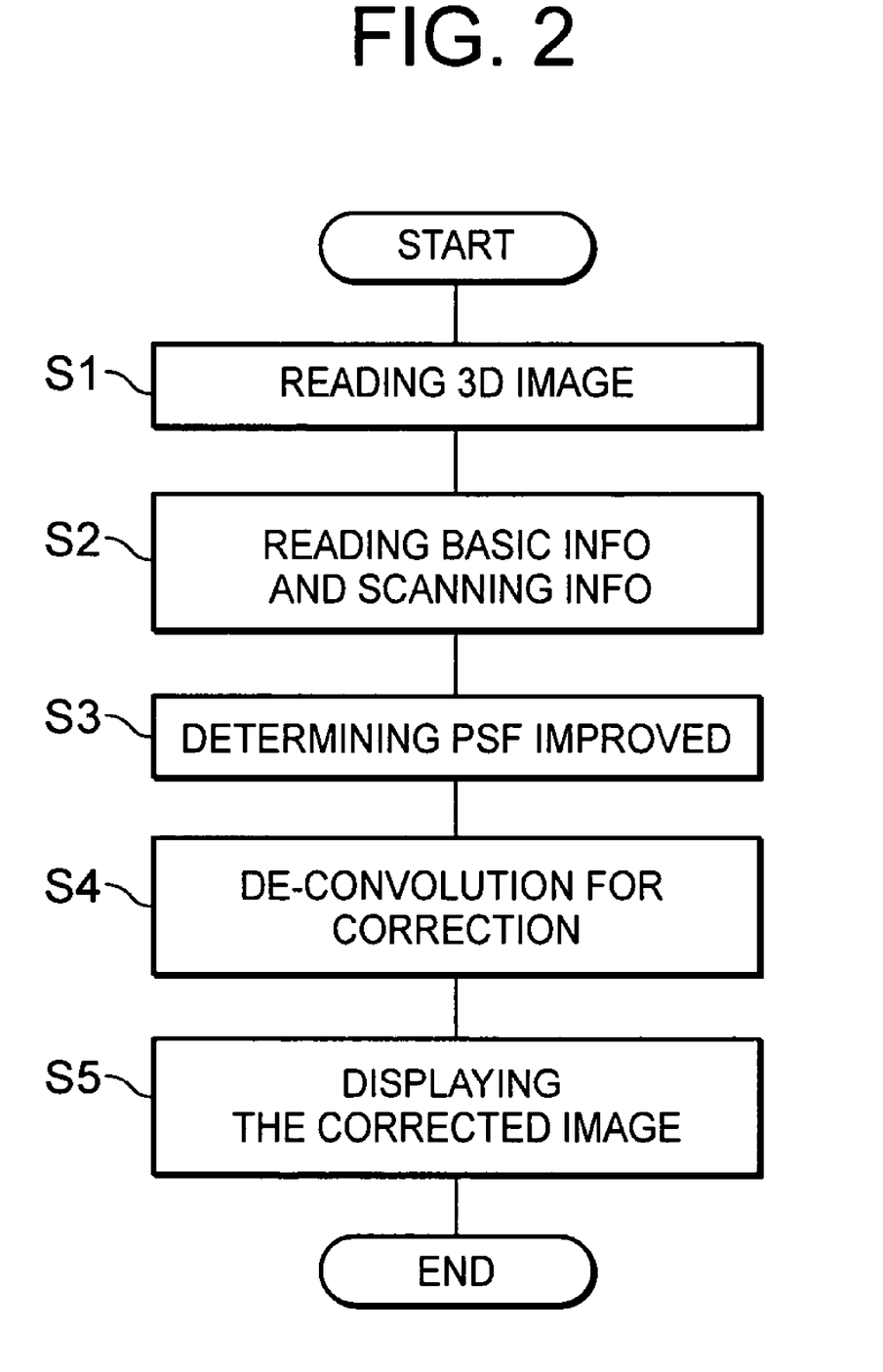
FIG. 2 is a flow chart illustrating general steps involved in a preferred process of substantially eliminating the blur, smear or fuzziness in the three-dimensionally reconstructed image data according to the current invention.
Figure 3A:
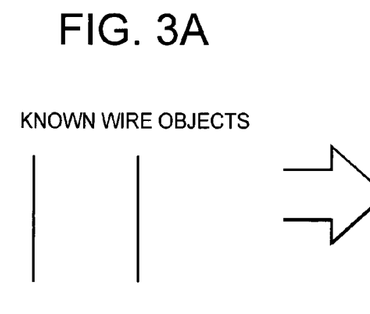
FIG. 3 is a diagram visually summarizing the above described preferred process including an ultimate effect of the minimized blur on the scanned CT image data according to the current invention.
Figure 3B:
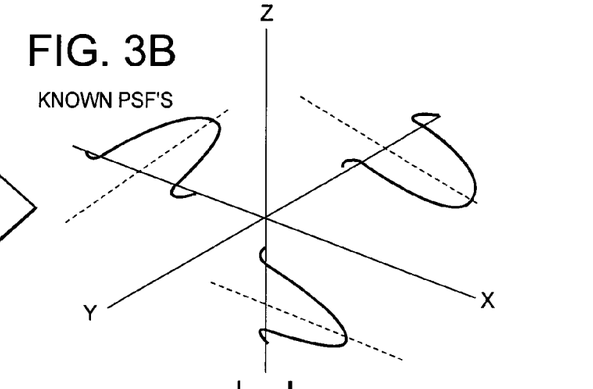
Figure 3C:
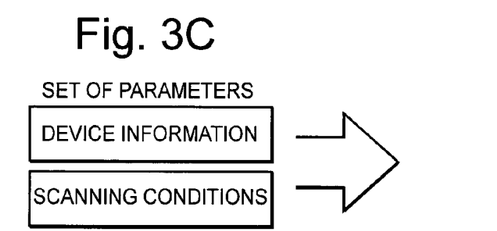
Figure 3D:
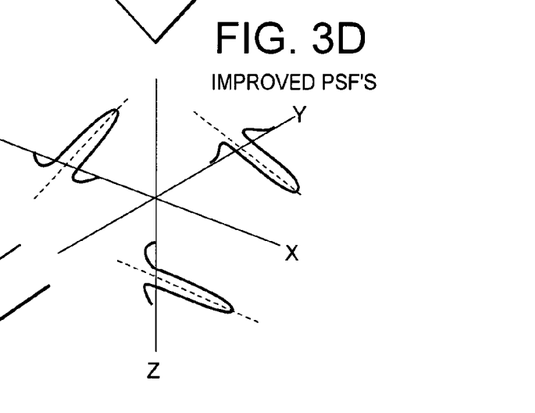
Figure 3E:
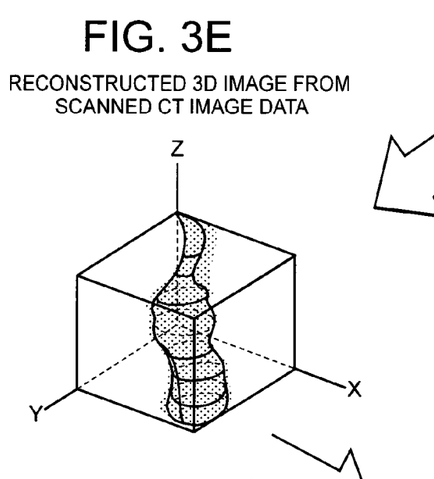
Figure 3F:
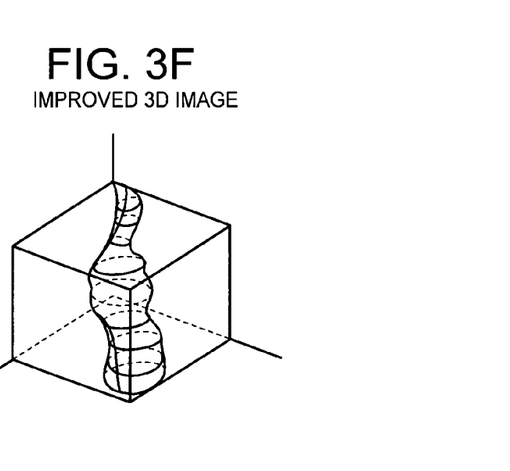

Now referring to FIG. 2, a flow chart illustrates general steps involved in a preferred process of substantially eliminating the blur, smear or fuzziness in the three-dimensionally reconstructed image data according to the current invention. In the description of the following steps, the components or units of FIG. 1 are referred in order to provide exemplary implementation of the steps. However, the following descriptions of the steps are exemplary and are not limited by the components, units or devices of FIG. 1. In a step S1, the data processing unit 24 reads the three-dimensionally reconstructed image data that has been collected and stored in the memory storage unit 22. For example, the three-dimensionally reconstructed image data with a contrast agent is used for substantially eliminating smear in the reconstructed image. In a subsequent step 2, the data processing unit 24 also reads the associated basic information and the associated scanning conditions that have been stored for the three-dimensionally reconstructed image data in the memory storage unit 22. The basic information is specifically related to the CT device 10 and includes the X-ray focus point size, the detector width and the focus-center distance. The scanning conditions are conditions under which a particular set of the three-dimensionally reconstructed image data is collected. For example, the scanning conditions include the slice thickness at the scan and at the reconstruction, a kind of the reconstruction algorithm, a reconstruction condition, a reconstruction function, a pixel size, a helical pitch for a helical scan and an angle in case of the vascular objects. It is preferred that the scanning conditions minimally include the slice thickness at the reconstruction and at the scan. Alternatively, the scanning conditions minimally include the slice thickness at the reconstruction and at the scan as well as the kind of the algorithm for reconstruction.

Still referring to FIG. 2, the data processing unit 24 performs the following steps of determining an improved corrective function, applying the improved corrective function and measuring a desired value based upon the improved data. Based upon the above basic and scan information, the data processing unit 24 determines a blur minimization function for each pixel in a step S3. The blur minimization function substantially minimizes the blur or smear in the three-dimensionally reconstructed image on a pixel basis. As described above, the blur is related to spatial resolution that is determined by the point spread function (PSF). However, the spatial resolution along the Z or body axis differs from that along the X or Y axial direction in three-dimensionally reconstructed image data. Since the spatial resolution is based upon the CT device specification and the scan conditions, the blur correction function is adjusted for each pixel based on the CT device specification and the scan conditions. The blur correction function is determined for each of the X, Y and Z directions in one preferred embodiment. Alternatively, for a certain need, the blur correction function is determined only for the Z direction in another preferred embodiment. Subsequently, in a step S4, the data processing unit 24 performs de-convolution on the three-dimensionally reconstructed image data based upon the above determined blur correction function. As a result of the de-convolution, the blur is substantially eliminated in the three-dimensionally reconstructed image. The corrected three-dimensionally reconstructed image data is optionally stored in the memory storage unit 22. In a final step S5, the data processing unit 24 displays the corrected three-dimensionally reconstructed image. In addition, based upon a user command, certain measurements such as a vessel obstruction or occlusion rate in the vessel are optionally made in the corrected three-dimensionally reconstructed image in the step S5. Because of the corrected three-dimensionally reconstructed image is used to determine the occlusion rate, the negative effect of smear or blur is substantially eliminated in the measurements. As a result, the measurements such as the occlusion rate become clinically reliable according to the current invention.

To further clarify the above description of some steps in the preferred process, the following terms are defined for the current invention. The blur minimization function is a corrective function or an improved PSF for substantially minimizing the blur, smear or fuzziness in the three-dimensional images that have been reconstructed from the measured CT image data. The blur minimization process or de-convolution process is a process in which the blur minimization function is applied. Herein after, the terms, "blur function" and "PSF" are synonymously used to refer to prior art techniques while the terms, "corrective function," "blur correction function," "blur minimization function" and "improved PSF" are substantially interchangeable to refer to the techniques according to the current invention.

To determine the corrective function in the step S3, a PSF is improved based upon the following set of parameters. In general, the parameters are grouped into two including the basic information and the scanning conditions, and a set of the parameters is associated with a particular three-dimensionally reconstructed image. Although the parameters are generally independent of each other, it is not necessary that a parameter has to be independent. The basic information is device-dependent or specifically related to a particular CT device. For example, the basic information includes the X-ray focus point size, the detector width and the focus-center distance. The scanning conditions are conditions under which a particular set of the three-dimensionally reconstructed image data is collected. For example, the scanning conditions include the slice thickness at the scan and at the reconstruction, a kind of the reconstruction algorithm, a reconstruction condition, a reconstruction function, a pixel size, a helical pitch for a helical scan and an angle in case of the vascular objects. It is preferred that the scanning conditions minimally include the slice thickness at the reconstruction and at the scan. Alternatively, the scanning conditions minimally include the slice thickness at the reconstruction and at the scan as well as the kind of the algorithm for reconstruction. The above parameters are used to improve a known PSF, which has been initially established during a training process based upon the measurements of a known object.

Among the device-dependent parameters, Table 1 below summarizes some detail of each parameter. The parameters each have a parameter name that is described as a variable in the table. Exemplary range values are provided for each of the parameters for a typical CT scanner. Discrete Weight Index is an integer that indicates a discrete sub range of the corresponding range and an associated weight value. The associated weight value is used to weigh the know PSF for substantially minimizing the blue, smear or fuzziness in the three-dimensional image data that has been reconstructed from the scanned CT image data. Although the numeric range values depend upon a particular scanner device, a number of sub ranges or a number of the discrete weight indexes remains the same in one preferred embodiment.

TABLE 1

| Parameter name | Description | Range | No of Discrete Weight Indexes |
|---|---|---|---|
| $d_{focus-x}$ | focus size in the x-direction | 0.1 mm~2 mm | 1 |
| $d_{focus-z}$ | focus size in the z-direction | 0.1 mm~2 mm | 1 |
| $a_{det-x}$ | detector aperture in the x-direction | 0.1 mm~2 mm | 1 |
| $d_{focus\ to\ center}$ | distance between focus and rotation center | 50 cm~65 cm | 1 |

Among the scanning condition parameters, Table 2 below summarizes some detail of each parameter. The parameters each have a parameter name that is described as a variable in the table. Exemplary range values are provided for each of the parameters for a typical CT scanner or a typical processing environment. Discrete Weight Index is an integer that indicates a discrete sub range of the corresponding range, a particular algorithm or a particular reconstruction mode. Each Discrete Weight Index is also associated with a particular weight value. The associated weight value is used to weigh the know PSF for substantially minimizing the blue, smear or fuzziness in the three-dimensional image data that has been reconstructed from the scanned CT image data. Although the numeric range values depend upon a particular scanner device, a number of sub ranges or a number of the discrete weight indexes remains the same in one preferred embodiment. The types of convolution filters, "$type_{conv.filter}$" include approximately forty known algorithms or methods of reconstructing the three-dimensional image from the scanned CT image data. These algorithms function as filters for adjusting the image quality in the three-dimensional reconstruction. For example, a different filter is used for a certain part of the scanned body image data. The types of reconstruction, "$type_{reconstruction}$" include four predetermined conditions under which the three dimensional reconstruction is performed. Exemplary conditions include a half reconstruction mode, a full reconstruction mode, a fan beam reconstruction mode and a cone-beam reconstruction mode. For the helical pitch, it is assumed that the helical pitch equals a couch distance per rotation. In case of four simultaneous slices in helical scan, assuming that the X-ray beam is 4 mm while the beam pitch ranges from 0.5 mm to 2 mm, the helical pitch ranges from 2 mm to 8 mm.

TABLE 2

| Parameter name | Description | Range | No of Discrete Weight Indexes |
|---|---|---|---|
| $t_{detector\ collimation}$ | slice thickness of detector collimation | 0.5 mm~8 mm | 6 |
| $t_{reconstruction}$ | slice thickness for reconstruction | 0.5 mm~10 mm | 6 |
| $type_{conv.\ filter}$ | type of convolution filter for reconstruction | 40 types | 40 |
| $type_{reconstruction}$ | type of reconstruction mode | 4 types | 4 |
| $size_{pixel}$ | Pixel size | 0.1 mm~1 mm | 5 |
| $P_{helical}$ | helical pitch (ex. four rows, 0.5 mm < $P_{beam}$ < 2 mm) | 2 mm~8 mm | 6 |

The improved PSF is thus determined based upon a combination of the above described parameters. In other words, the improved PSF or $PSF_{improved}$ is roughly defined as follows:

$$PSF_{improved} = PSF\ (d_{focus-x},\ d_{focus-z},\ a_{det-x},\ d_{focus\ to\ center},\ t_{detector\ collimation},\ t_{reconstruction},\ type_{conv.filter},\ type_{reconstruction},\ size_{pixel},\ p_{helical}) \quad (1)$$

Although any combination of the parameters are used to weigh PSF, it is preferred that that the scanning conditions minimally include $t_{reconstruction}$. Alternatively, the scanning conditions minimally include $t_{reconstruction}$ as well as $type_{conv.filter}$. Actual weighing processes are implemented in various manners. In one preferred embodiment, each of the above described parameters is implemented by a separate table that contains Discrete Weight Indexes and the corresponding weight values to be used for improving the effect of a known PSF. The total number of the combinations of the weight values is the multiple of the numbers of Discrete Weight Indexes for all of the above described parameters.

In general, the de-convolution process in the step S4 involves the reverse of convolution. Let M be a CT image that is a result of scanning a known object whose ideal image is O, then M is defined as a result of convolution as follows:

$$M = PSF\ O \quad (2)$$

where PSF is a point spread function and is convolution. From the measured CT image M, the true object image O is determined by performing de-convolution on the CT image according to PSF. Let $PSF^{-1}$ be a de-convoluted function, then a de-convoluted image O' is defined as follows from Equation (3):

$$O' = M\ PSF^{-1} \quad (3)$$

To obtain the de-convoluted image O', an iterative solving technique is used. The iterative method is essentially the same as various general iterative methods for solving hyper complex simultaneous liner equations. In the following example, the Jacobi method is further described. At the beginning, an initial solution is assumed. For example, the initial solution is set to a null image that is a de-convolution image of the measured image. Subsequently, an error E is calculated as follows in Equation (4):

$$E = (M - PSF \cdot O)^2 \quad (4)$$

The iterative method obtains the object image O in such a manner that the error E becomes the least. That is, E→min. Based upon the slope of the error E, a correction vector —dE/d0 is determined for converging the object image O during iterations as expressed in the following equation (5):

$$O_{N+1} = (O_N - a) dE/d0 \quad (5)$$

where "a" is a constant. In order to maximize the convergence speed, other methods such as the maximum diving method and the conjugate gradient method optimally select the constant a and the correction vector. However, as the convergence speed increases, since the convergence or de-convolution is negatively affected by becoming more susceptible to effects such as image noise, it is necessary to consider the balance between the image quality and the convergence speed.

Still referring to FIG. 2, in the above described preferred process of substantially eliminating the blur, smear or fuzziness in the three-dimensionally reconstructed image data according to the current invention, the improved PSF or blur minimization function is used in lieu of "PSF" in Equations (3) and (4). The use of $PSF_{improved}$ or blur minimization function greatly minimizes the undesired blur in the de-convoluted image O' which becomes substantially close to the true image O. Although the above description shows that $PSF_{improved}$ is uniformly applicable to the scanned image data in three directions, the $PSF_{improved}$ is preferably defined for each of the X, Y and Z directions since the amount of blur is generally dependent upon the direction with respect to the scan. For this reason, $PSF_{improved}$ is further defined by an additional parameter to indicate the direction or alternatively defined as follows:

$$PSF_{improved}(x_1, y_1, z_1) = PSF(d_{focus-x}, d_{focus-z}, a_{det-x},$$
$$d_{focus\ to\ center}, t_{detector\ collimation}, t_{reconstruction},$$
$$type_{conv.filter}, type_{reconstruction}, size_{pixel}, P_{helical}) \quad (6)$$

where $x_1$, $y_1$, $z_1$ are respective coordinates or alternatively the directions of the scan. Furthermore, the above described improvement of a know PSF is applicable to any other directions such as predetermined oblique directions. In other words, we know that the true image of an object of interest cannot be ideally measured due to various sources of inaccuracy including mechanical and optical components as expressed by the $PSF_{improved}$ as follows:

$$V(x, y, z) = PSF_{improved}(x_1, y_1, z_1) | v(x, y, z) \quad (7)$$

where v (x, y, z) is a three-dimensional ideal or true image data while V(x, y, z) is a three-dimensional measured image data. Thus, from the measured CT scan image data V(x, y, z), near-ideal corrected three-dimensional image data v'(x, y, z) is defined by the following de-convolution process as described in Equation (8):

$$v'(x, y, z) = PSF_{improved}^{-1}(x_1, y_1, z_1) | V(x, y, z) \quad (8)$$

Although Equation (8) is noise prone as discussed above, a proper iteration technique leads to a substantially accurate result. As also discussed above, Equation (8) is performed on each pixel in one preferred embodiment.

Now referring to FIG. 3, a diagram visually summarizes the above described preferred process including an ultimate effect of the minimized blur on the scanned CT image data according to the current invention. FIG. 3A shows a sub-process in which a PSF is determined based upon known objects such as wire models. For example, the size of the two wires is less than the spatial resolution of the detectors of a particular CT scanner. Thus, a set of three PSF's is established in the X, Y and Z directions as shown in FIG. 3B. The three PSF's are each illustrated by a bell-shaped curve to indicate a rather wide range of point distributions. Subsequently, the same CT scanner scans an object of interest such as blood vessels and reconstructs a three-dimensional image such as shown in FIG. 3E. The three-dimensionally reconstructed image of the blood vessel includes blurred and smeared portions that tend to lead to inaccurate measurements of the physical characteristics of the blood vessels. The blurred or smeared image is considered to be a result of convolution of blur and smear with an original or ideal image of interest. A set of information is collected and stored for the particular scanned image data. The information includes device characteristics of the CT scanner and the conditions under which the scanning took place for the particular scanned data. As shown in FIG. 3C, both the device information and the scanning information are used as parameters to improve the PSF's for substantially eliminating blur or smear in the scanned CT image data for the blood vessels. The parameters include a combination of $d_{focus-x}$, $d_{focus-z}$, $a_{det-x}$, $d_{focus\ to\ center}$, $t_{detector\ collimation}$, $t_{reconstruction}$, $type_{conv.filter}$, $type_{reconstruction}$ and $size_{pixel}, P_{helical}$ as described with respect to TABLES 1 and 2. As the result of the improvement, FIG. 3D illustrates that the three PSF's are narrower than in FIG. 3B to show more limited point distributions for a better resolution. The reconstructed three-dimensional image of FIG. 3E is now de-convoluted with the improved PSF's in order to substantially remove the blur and smear. Due to the substantially minimized blur and smear, the three-dimensionally reconstructed image of the blood vessel is now illustrated with clearer boundaries as shown in FIG. 3F. Consequently, the physical measurements of the blood vessel becomes more accurate in the improved three-dimensional image of FIG. 3F than that of FIG. 3E.

Lastly, the above described improved PSF is applicable to three-dimensional data, three-dimensional reconstructed data, two-dimensional data or any combination thereof. The above described improved PSF is also applicable to the image data that has been collected by other types of scanners including MRI scanners and ultrasound scanners. The above described techniques according to the current invention are not limited to medical applications but also are applicable to other fields such as reverse engineering of semi conductor devices.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of substantially minimizing blur in image data, comprising the steps of:

determining a point spread function (PSF) based upon the first image data by scanning a known object;

scanning an object of interest to generate second image data with X-ray CT scanning parameters;

obtaining an improved PSF based on a combination of scanning parameters and the PSF, the scanning parameters including at least one of slice thickness of detector collimation, slice thickness for reconstruction, type of convolution filter, type of reconstruction mode, pixel size, helical pitch and focus size; and de-convoluting the second image data with the improved PSF.

2. The method of substantially minimizing blur in image data according to claim 1 wherein said improved PSF substantially minimizes blur in the X direction.

3. The method of substantially minimizing blur in image data according to claim 1 wherein said improved PSF substantially minimizes blur in the Y direction.

4. The method of substantially minimizing blur in image data according to claim 1 wherein said improved PSF substantially minimizes blur in the Z direction.

5. The method of substantially minimizing blur in image data according to claim 1 wherein said second image data includes pixels, said improved PSF being applied to each of the pixels.

6. The method of substantially minimizing blur in image data according to claim 1 wherein said parameters includes a combination of device-dependent parameters and scanning condition parameters.

7. The method of substantially minimizing blur in image data according to claim 6 wherein a value of each of said parameters is ultimately associated with a predetermined weight value.

8. The method of substantially minimizing blur in image data according to claim 7 wherein said device dependent parameters include $d_{focus-x}$ indicating a focus size in the x-direction, $d_{focus-z}$ for indicating a focus size in the Z-direction, $a_{det-x}$ for indicating a detector aperture in the x-direction and $d_{focus\ to\ center}$ for indicating a distance between a focus and a rotation center.

9. The method of substantially minimizing blur in image data according to claim 7 wherein said scanning condition parameters include $t_{detector\ collimation}$ for indicating a slice thickness of detector collimation, $t_{reconstruction}$ for indicating a slice thickness for reconstruction, $type_{conv.filter}$ for indicating a type of convolution filter for reconstruction, $type_{reconstruction}$ for indicating a type of a reconstruction mode, $size_{pixel}$, for indicating a pixel size and $p_{helical}$ for indicating a helical pitch.

10. The method of substantially minimizing blur in image data according to claim 1 wherein said first image data and said second image data are two-dimensional.

11. The method of substantially minimizing blur in image data according to claim 1 wherein said first image data and said second image data are three-dimensional.

12. The method of substantially minimizing blur in image data according to claim 1 wherein said de-convoluting step is performed on every pixel in said second image data.

13. The method of substantially minimizing blur in image data according to claim 1 wherein said first image data and said second image data are scanned by an X-ray CT device.

14. The method of substantially minimizing blur in image data according to claim 13 wherein the object of interest is a human body, a scanning direction of the human body being along a body axis in a Z direction, said improved PSF substantially minimizing blur in the Z direction.

15. The method of substantially minimizing blur in image data according to claim 14 wherein said improved PSF substantially minimizes blur in X and Y directions that are perpendicular to the Z direction.

16. The method of substantially minimizing blur in image data according to claim 15 wherein said parameters include $t_{reconstruction}$ for indicating a slice thickness for reconstruction.

17. The method of substantially minimizing blur in image data according to claim 16 wherein said parameters include $type_{reconstruction}$ for indicating a type of a reconstruction mode.

18. The method of substantially minimizing blur in image data according to claim 17 wherein said de-convoluting step is performed on every pixel in said second image data.

19. A method of substantially minimizing blur in image data, comprising the steps of:
determining a point spread function (PSF) based upon the first three-dimensional image data by scanning a known object;
scanning an object of interest to generate second three-dimensional image data with X-ray CT scanning parameters;
obtaining an improved PSF based on a combination of parameters and the PSF, the parameters including a combination of device-dependent parameters and scanning condition parameters to generate the improved PSF, the scanning parameters including at least one of slice thickness of detector collimation, slice thickness for reconstruction, type of convolution filter, type of reconstruction mode, pixel size, helical pitch and focus size; and
de-convoluting the second three-dimensional image data with the improved PSF.

20. The method of substantially minimizing blur in image data according to claim 19 wherein said parameters include $t_{reconstruction}$ for indicating a slice thickness for reconstruction.

21. The method of substantially minimizing blur in image data according to claim 19 wherein said parameters include $type_{reconstruction}$ for indicating a type of a reconstruction mode.

22. A method of substantially minimizing blur in image data, comprising the steps of:
scanning a known object to generate first image data;
determining a point spread function (PSF) based upon the first image data for the known object;
scanning an object of interest to generate second image data; weighing the PSF according to a combination of parameters to generate an improved PSF, said parameters including a combination of device-dependent parameters and scanning condition parameters, a value of each of said parameters being ultimately associated with a predetermined weight value, said device dependent parameters including $d_{focus-x}$ for indicating a focus size in the x-direction, $d_{focus-z}$ for indicating a focus size in the Z-direction, $a_{det-x}$ for indicating a detector aperture in the x-direction and $d_{focus\ to\ center}$ for indicating a distance between a focus and a rotation center; and
de-convoluting the second image data with the improved PSF.

23. A method of substantially minimizing blur in image data, comprising the steps of:
scanning a known object to generate first image data;
determining a point spread function (PSF) based upon the first image data for the known object;
scanning an object of interest to generate second image data; weighing the PSF according to a combination of parameters to generate an improved PSF, said parameters including a combination of device-dependent parameters and scanning condition parameters, a value of each of said parameters being ultimately associated with a predetermined weight value, said scanning condition parameters including $t_{detector\ collimation}$ for indicating a slice thickness of detector collimation, $t_{reconstruction}$ for indicating a slice thickness for reconstruction, $type_{conv\ filter}$ for indicating a type of convolution filter for reconstruction, $type_{reconstruction}$ for indicating a type of a reconstruction mode, $size_{pixel}$, for indicating a pixel size and $p_{helical}$ for indicating a helical pitch; and de-convoluting the second image data with the improved PSF.

24. A method of substantially minimizing blur in image data, comprising the steps of:

generating an image data by reconstructing scan data obtained by scanning of an object with X-ray CT scanning parameters;

obtaining an improved point spread function (PSF) based upon a combination of the scanning parameters and a PSF previously determined based upon an image data obtained by scanning a known object, the scan parameters including at least one of type of convolution filter, type of reconstruction mode, pixel size, helical pitch and focus size; and de-convoluting the second image data with the improved PSF.

25. An apparatus for substantially minimizing blur in scanned image data, comprising:

a scanning unit for respectively scanning a known object to generate first image data and an object of interest to generate second image data;

a data processing unit connected to said scanning unit for determining a point spread function (PSF) based upon the first image data for the known object, said data processing unit correcting the PSF according to a combination of parameters to generate an improved PSF, said data processing unit de-convoluting the second image data with the improved PSF for substantially minimizing blur in the second image data; and a memory unit connected to said scanning unit and said data processing unit for storing the parameters, the first image data and the second image data, the parameters including a combination of device-dependent parameters and scanning condition parameters, the device dependent parameters including $d_{focus-x}$ for indicating a focus size in the x-direction, $d_{focus-z}$ for indicating a focus size in the Z-direction, $a_{det-x}$ for indicating a detector aperture in the x-direction and $d_{focus\ to\ center}$ for indicating a distance between a focus and a rotation center.

26. An apparatus for substantially minimizing blur in scanned image data, comprising:

a scanning unit for respectively scanning a known object to generate first image data and an object of interest to generate second image data;

a data processing unit connected to said scanning unit for determining a point spread function (PSF) based upon the first image data for the known object, said data processing unit correcting the PSF according to a combination of parameters to generate an improved PSF, said data processing unit de-convoluting the second image data with the improved PSF for substantially minimizing blur in the second image data; and a memory unit connected to said scanning unit and said data processing unit for storing the parameters, the first image data and the second image data, the parameters including a combination of device-dependent parameters and scanning condition parameters, the scanning condition parameters including $t_{detector\ collimation}$ for indicating a slice thickness of detector collimation, $t_{reconstruction}$ for indicating a slice thickness for reconstruction, $type_{conv.filter}$ for indicating a type of convolution filter for reconstruction, $type_{reconstruction}$ for indicating a type of a reconstruction mode, $size_{pixel}$, for indicating a pixel size and $p_{helical}$ for indicating a helical pitch.

* * * * *